United States Patent [19]

Long et al.

[11] 4,009,395
[45] Feb. 22, 1977

[54] WAVE AND TIDE ACTUATED HYDRAULIC ELECTRICAL GENERATING APPARATUS

[76] Inventors: Charles S. Long; Jamesina Long, both of Winesap Road, Rte. 8, Box 303, Jonesboro, Ark. 72401

[22] Filed: Nov. 4, 1974

[21] Appl. No.: 520,640

[52] U.S. Cl. .............................. 290/53; 417/332; 60/506
[51] Int. Cl.² ....................................... F03B 13/12
[58] Field of Search ............. 290/424, 344, 53, 54; 60/495–507; 417/330–337

[56] References Cited

UNITED STATES PATENTS

| 738,996 | 9/1903 | Hagen | 60/498 |
| 2,848,189 | 8/1958 | Caloia | 60/505 |

FOREIGN PATENTS OR APPLICATIONS

| 557,813 | 5/1922 | France | 60/500 |
| 15,615 | 6/1898 | United Kingdom | 60/497 |
| 7,087 | 9/1911 | United Kingdom | 60/507 |

Primary Examiner—Robert K. Schaefer
Assistant Examiner—John W. Redman
Attorney, Agent, or Firm—Head, Johnson & Chafin

[57] ABSTRACT

A wave and tide actuated hydraulic electrical generating apparatus including a flotation chamber floatingly supported in a water containing basin area connected to a fluctuating water source, such as the tide and wave level of an ocean, the flotation chamber rising and falling with the changes in elevation of the water in the basin, such as caused by the movement of waves, with the chamber being linked by lever arms through suitable gear mechanisms to a multitude of piston rods associated with a like number of hydraulic cylinders which are connected in hydraulic parallel relationship, the movement of the flotation chamber in an upward direction effecting movement of the piston rods in a first direction relative to the cylinders, the movement of the flotation chamber in a downward direction effecting movement of the piston rods in the opposite direction in their associated cylinders, this movement of the piston rods in their associated cylinders effecting a pumping of hydraulic fluid to a hydraulic turbine to power the same, the turbine in turn being drivingly connected to an electric generator such that movement of the water in the basin effecting movement of the flotation chamber effects the generation of electrical energy by means of the hydraulic turbine powered by the hydraulic fluid from the hydraulic cylinders which are, in turn, operated by the lever arms connected to the flotation chamber.

1 Claim, 4 Drawing Figures

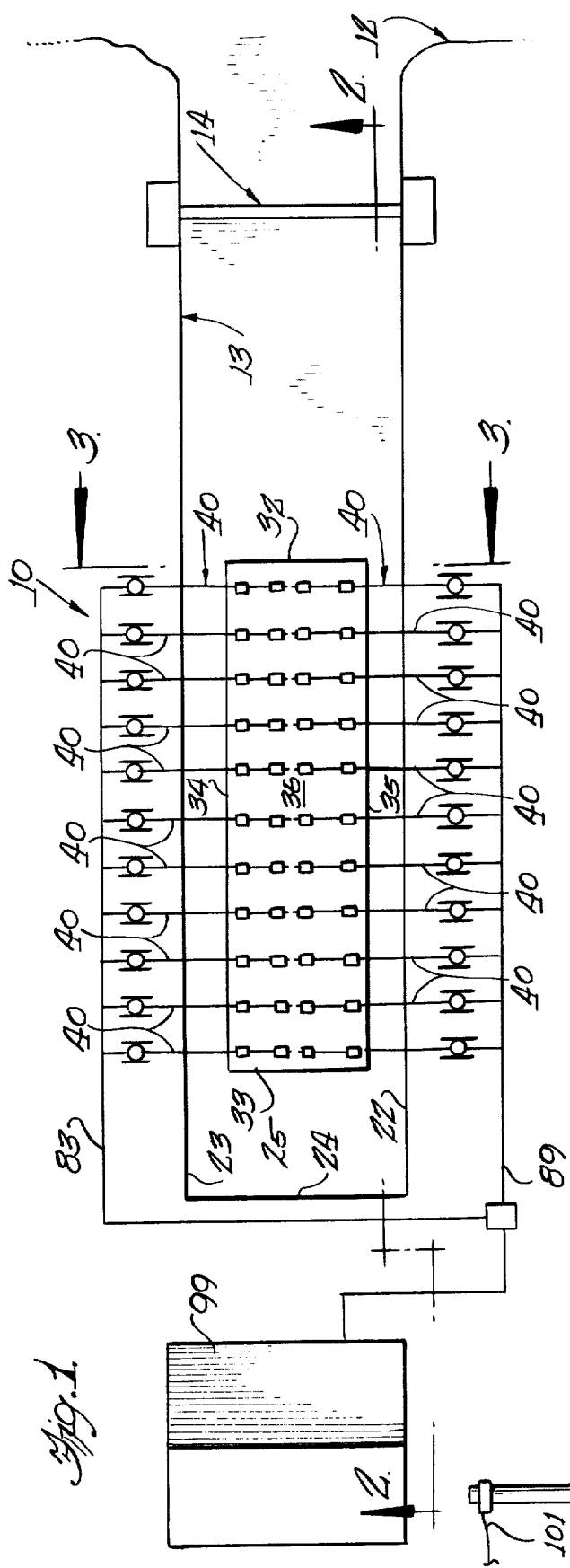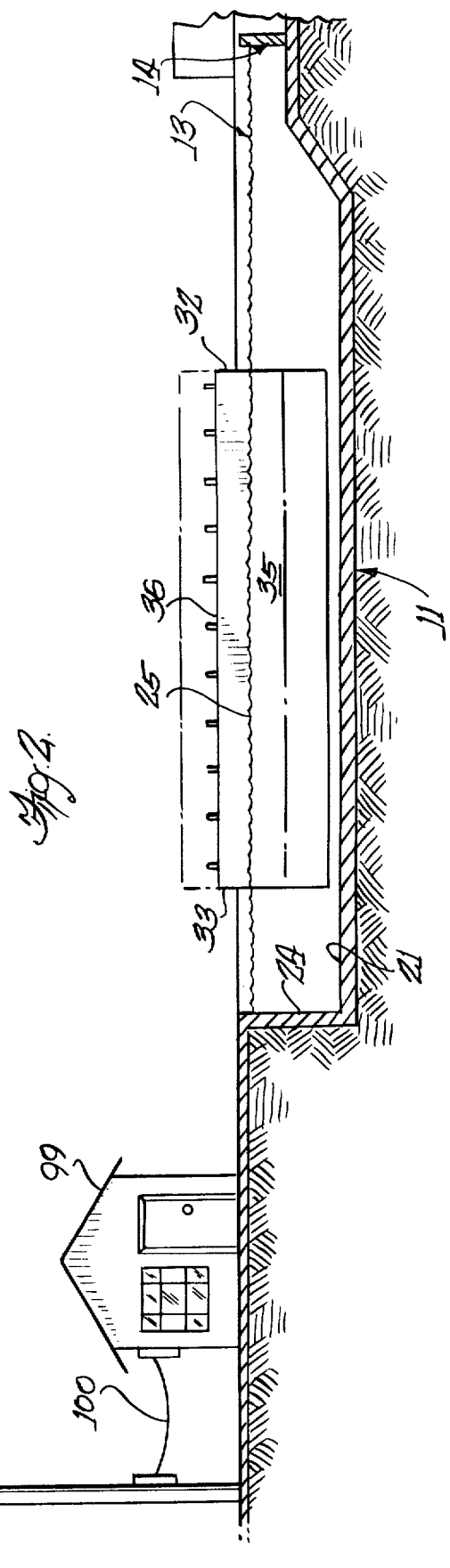

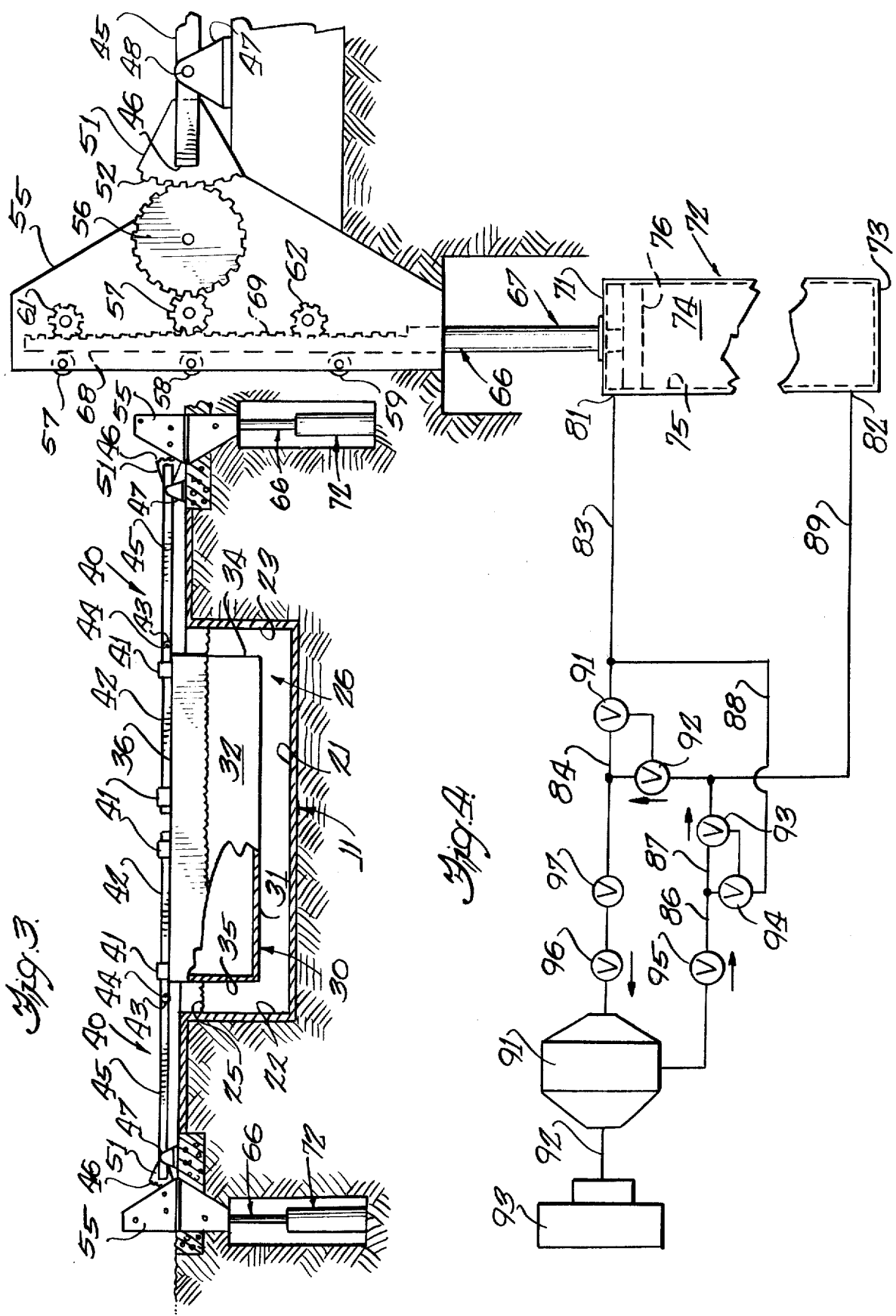

WAVE AND TIDE ACTUATED HYDRAULIC ELECTRICAL GENERATING APPARATUS

BACKGROUND OF THE INVENTION

1. Field of the Invention

This invention relates generally to electrical generating apparatus and more particularly to a novel wave and tide actuated hydraulic electrical generating apparatus which utilizes the movement of tide water and waves to develop mechanical power which is then converted to electrical power.

2. Description of the Prior Art

It has long been known to generate electrical power by means of water or steam operated turbines. However, very few areas are sufficient for water operated turbines as they require a dam to provide a head of water and thus a differential to pass through the turbine to power the same. Alternatively, they require some large vertical drop of water from a storage point to a discharge point so that sufficient energy is encompassed in the falling water to power the turbine.

As to steam powered turbines, these are the most frequently used with the steam normally being provided by the burning of fuels, such as coal, gas, oil and the like. Further, in most recent years the use of atomic energy to produce super-heated steam has been provided.

However, the burning of fossil type fuels requires pollution abatement equipment, this being expensive to purchase and maintain, and also robbing the generating plant of some of its efficiency during operation thereof. As to atomic powered plants, such require the use of huge quantities of cooling water, with pollution requirements being such that the water after being heated upon passing through the atomic plant must then be re-cooled back to its initial temperature before being allowed to be discharged to the surrounding area. This is a difficult, time consuming, and excessively expensive procedure which has resulted in atomic plants being somewhat abandoned for the present time until such cooling problems are overcome.

Thus, all presently known and readily available sources for the generation of electrical energy suffer from deficiencies and disadvantages, but yet they must be used as it is acknowledged that the generation of electrical power and the capacity for such generation must be constantly increased each year in view of the ever increasing world wide population.

SUMMARY OF THE INVENTION

The present invention recognizes the deficiencies and disadvantages of presently available electrical generating apparatus, and provides a novel pollution free solution thereto in the form of a wave and tide actuated hydraulic electrical generating apparatus which develops mechanical power through use of wave and tide motion of a body of water, this mechanical power in turn powering a hydraulic turbine which, in turn, powers an electric generator for the generation of electrical energy in a pollution free manner as no fossil fuels, atomic energy, or the like are required.

It is a feature of the present invention to provide a wave and tide actuated hydraulic electrical generating apparatus for the generating of electrical energy in a pollution free manner utilizing a free source of energy.

The features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a top plan view of the apparatus of the present invention;

FIG. 2 is a cross-sectional view taken along line 2—2 of FIG. 1;

FIG. 3 is a cross-sectional view taken along line 3—3 of FIG. 1; and

FIG. 4 is an elevational view taken in cross-section of a typical hydraulic cylinder and drive associated therewith and used in the apparatus and as connected to suitable hosing and tubing and valves to the hydraulic turbine and electrical generator of the apparatus.

DESCRIPTION OF THE PREFERRED EMBODIMENT

Referring now to the drawings in detail there is illustrated a preferred form of a wave and tide actuated hydraulic electrical generating apparatus constructed in accordance with the principles of the present invention and designated generally in its entirety by the reference numeral 10 and which is comprised generally of a basin area 11 in communication with a body of water, such as ocean 12 by means of a channel 13 with an electrically operated gate 14 disposed intermediate the body of water 12 and the apparatus 10.

The basin area is of an elongated hollow rectangular box-like configuration having a bottom surface 21, opposed side surfaces 22 and 23, a back surface 24, and an open front surface in connection with the channel 13 such that water 25 flows freely into the basin area 26 defined intermediate the side and back wall surfaces. Channel 13 is connected to the body of water 12, the level of the water 13 constantly fluctuates in level with the level of the body of water 12 such that water level 25 in basin 26 constantly rises and lowers both with the tides and wave motion within the basin area.

Disposed in the basin area 26 floating on water level 25 is flotation chamber 30 which is of an elongated rectangular hollow box-like configuration having bottom surface 31, opposed end surfaces 32 and 33, and opposed side surfaces 34 and 35 with a flat top surface 36. The flotation chamber 30 rises and lowers in a vertical direction with the level of the water 25 in basin area 26.

Disposed at longitudinally spaced apart positions across top surface 36 of flotation chamber 30 are identically configured and oppositely laterally extending lever arm and piston assemblies generally designated by reference numeral 40 and which are illustrated in greater detail in FIGS. 3 and 4 of the drawings wherein, in FIG. 3, a pair of the lever arm and piston assemblies are generally shown with the details of a single typical unit being shown in FIG. 4.

Referring to FIG. 3 it is seen that there are affixed along the top surface 36 of flotation chamber 30 a multitutde of longitudinal rows of laterally aligned generally rectangularly configured open ended and hollow collar members 41 which are divided into associated pairs and which slidingly receive therethrough an elongated rectangularly shaped beam 42 extending therebetween for lateral sliding movement therethrough and having its outermost end 43 connected by pivot pin 44 to the adjacent end of lever arm 45 which extends longitudinally outwardly therefrom and terminates at outermost end 46. A stationary pivot fulcrum 47 is provided spaced from the side walls 22, 23 of the basin and support therein a pivot 48 which pivotally connects to the lever arm 45 at a position spaced inwardly from outermost end 46. As seen in FIG. 3, upon vertical movement of flotation chamber 30 in an upward and downward direction, arms 42 move laterally inwardly and outwardly of the flotation chamber and, through their pivot connection 44 to the lever arms 45, effect the pivotal movement of the lever arms 45 about fulcrum pin 48 to thus effect the pivotal swinging movement of the outermost end 46 relative to the fulcrum pin 48.

An arcuate segment gear 51 is affixed along its diametric axis to end 46 and is provided with a continuous row or rack of teeth 52 along the arcuate outermost perimeter edge thereof.

A pair of vertical parallel spaced apart brackets 55 are provided in a manner straddling segment gear 51 and spaced outwardly from gear teeth 52, there being pivotally mounted between the brackets a first circular gear 56 having teeth in meshing engagement with a second circular gear 57 which is of a diameter much greater than the diameter of the first gear. The teeth 52 of segment gear 51 are disposed in meshing engagement with the teeth of gear 56 such that, as seen in FIG. 4, segment gear 51 with gears 56 and 57 provide a gear trade with slight pivotal movement of the segment gear 51 effecting a much larger rotative movement of the gear 57 to thus increase the output from the segment gear as will be later described.

Extending between the brackets 51 rotatively supported therebetween are a series of vertically spaced apart and aligned roller guides 57, 58 and 59. Spaced inwardly of brackets 55 relative to roller guides 57–59 and vertically spaced apart and vertically aligned are a pair of rotatively supported pinion gears 61 and 62 each provided with gear teeth about the peripheral edges thereof. Extending intermediate the rollers 57–59 and the gears 61, 62 is the top end portion 65 of a piston rod 66 having a bottom end portion 67, the top end portion having a flat vertically extending back surface 68 disposed in guided arrangement supported on roller guides 57–59. Diametrically opposite the flat surface 68 of top portion 66 is a rack of longitudinally extending continuous teeth 69 of a size and configuration to engage within the teeth of pinion gear 61 and 62 to be guided thereby, and which are also drivingly engaged by the teeth of gear 57.

The bottom end portion 67 of piston rod 66 is of an elongated cylindrical configuration which is telescopically received through the top end 71 of a hydraulic cylinder 72 having a bottom end 73 and cylindrical side walls 74 with a hydraulic fluid containing compartment 75 disposed therein and in which piston 76 is disposed and concentrically connected to the bottommost end of piston rod end portion 67. A valve 81 is provided adjacent top end 71 of cylinder 72, with a valve 83 provided adjacent bottom end 73 of cylinder 72, both the valves 81 and 82 being in communication with the compartment 75.

The valves 81 and 82 are connected by suitable lengths of tubing 83–89 to a hydraulically energized turbine 91 which, in turn, is connected by a shaft 92 to an electrical generator 93 for the generation of electrical energy thereby upon rotation of shaft 92 by turbine 91.

Interposed in tubes 83–89 are valves 91–97 for controlling the flow of hydraulic fluid therethrough between the cylinder 72 and the turbine 91. The valve 97 is a pressure control valve to assure a constant pressure and flow of hydraulic fluid to the turbine for assuring a constant rotation of the turbine for a constant driving rotation of the electrical generator. Valve 96 is a one-way directional valve permitting flow of the hydraulic fluid only in the direction as indicated into the turbine 91. Valve 95 is a one-way directional control valve permitting flow of the hydraulic fluid only in a direction out of the turbine 91 such as illustrated by the arrow associated with the valve.

Valves 91, 92 and 93, 94 are associated with the tubes 83–89 to provide for the flow of the hydraulic fluid through the tubes in a direction into the inlet of the hydraulic turbine during both the upward and downward stroke movement of the piston 76 in cylinder 72 such that during all movements of the piston hydraulic fluid is pumped through the tubes in a manner to properly power the hydraulic turbine in the operational direction thereof. The gate 14 is electrically powered adapted for immediate opening and closing to capture and free water influent and effluent in the canal 13.

As clearly seen in FIG. 4, the gear train mechanism of segment gear 51, gear 56 and gear 57 is such that slight movements of the segment gear 51 are increased in scope and magnitude through the gear train to thus increase the stroke of the piston rod 66 under driving movement of the gear 57, this thus increasing the stroke of the piston 76 in cylinder compartment 75 to increase the displacement of hydraulic fluid from the cylinder and through the tubes 83–89 to drive the turbine 91.

It is to be understood that while only a single lever arm and cylinder assembly 40 has been described and illustrated in FIGS. 3 and 4 for ease of descriptive purposes, that as seen in FIG. 1 there are a large multitude of such lever arms and cylinders with the cylinders 72 all being connected in parallel hydraulic relationship as to the valves 81 and 82 thereof for the powering of the turbine through the tubes 83–89 by the cooperative action of all of the cylinders.

As seen in FIGS. 1 and 2, the turbine 91 and generator 93 and associated support equipment may be contained in a shed type structure 99 from which the generated electrical power is discharged through wire 100 to transmission line 101.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size and arrangement of parts may be resorted to without departing from the spirit of the invention, the scope of the novel concepts thereof, or the scope of the sub-joined claims.

Having thus described the invention, what is claimed is:

1. A wave and tide actuated hydraulic electrical generating apparatus comprising, in combination:
   a hollow basin area connected with a source of water having a fluctuating water level;

a gate interposed between said basin and said source of water and operable between an open and closed position for retaining and releasing water from said basin area;

a flotation chamber disposed in said basin and floatingly supported on said water level, said chamber movable upwardly and downwardly on said water level;

a multitude of substantially identical lever arm assemblies disposed longitudinally spaced apart from each other completely along said flotation chamber and projecting outwardly over opposite portions of said flotation chamber to extend beyond said basin area, one end of each lever assembly movably connected to said flotation chamber, the opposite end of each of said lever assemblies projecting outwardly from said flotation chamber over said basin and terminating a distance spaced outwardly from said basin area in an outermost end;

a stationary pivot fulcrum associate with each outermost end of each lever arm assembly and spaced inwardly from said outermost end and pivotally connected to said lever arm assembly to provide pivotal rotation thereabout;

a multitude of hydraulic cylinders each having a piston rod associated therewith, each hydraulic cylinder being associated with the outermost end portion of an associated one of said lever arm assemblies;

a drive gear train disposed intermediate said outermost end of each lever arm assembly and said piston rod of each associate hydraulic cylinder for effecting reciprocal movement of said piston rod in said cylinder upon pivotal movement of said outermost end member about said stationary pivot fulcrum, and including means to increase the magnitude of the stroke of the piston rod with respect to the fluctuation of the water level;

hydraulic fluid disposed in said hydraulic cylinder chamber;

a hydraulically powered turbine;

suitable hosing connecting said multitude of hydraulic cylinders in parallel hydraulic relationship;

suitable hosing connecting said parallel connected cylinders to each hydraulic turbine for driving the same by transmitting hydraulic fluid therethrough from said cylinder through said turbine and back to said cylinders;

a pressure control valve disposed in said hosing for maintaining accurate flow of the fluid pressure therethrough to assure a constant pressure and volume of fluid to be delivered to said hydraulic turbine;

a first valve associated with an inlet to said turbine being of a one-way valve construction only permitting fluid to enter said inlet;

a second valve associated with an outlet of said turbine and being of a one-way structure to only permit fluid to exit from said outlet;

valve means associated with said hosing to provide for fluid direction from said hydraulic cylinders to said turbine in a manner such that fluid always enters said inlet and exits from said outlet during both the inward and outward stroke of said piston rod from said associated cylinders; and an electrical generator mechanically connected to a shaft of said hydraulic turbine to be drivingly rotated thereby for generation of electrical energy;

wherein said flotation chamber is of a rectangular box-like configuration having a flat bottom surface, a flat top surface, opposed side wall surfaces, and opposed end wall surfaces; said flotation chamber being floatingly supported in said basin area; and wherein said lever arm assemblies each comprise:

a pair of laterally spaced apart collar members affixed to said flotation chamber top surface;

a first lever arm slidingly received through said collar members for lateral sliding reciprocal movement relative thereto and having an inner end and an outer end, said inner end disposed inwardly of said flotation chamber with said outer end projecting laterally outwardly over a side edge of said flotation chamber and inwardly of said basin area;

a second lever arm of an elongated rigid structure having an inner end and an outer end;

pivot means connecting said second lever arm inner end to said first lever arm outer end;

said stationary pivot fulcrum mounted outwardly of said basin area in longitudinal alignment with said first and second lever arms and spaced inwardly of said outer end of said second lever arm and pivotally secured thereto for pivotal support thereof;

vertical upward and downward movement of said flotation chamber effecting lateral sliding movement of said first lever arm which, in turn, effects pivotal movement of said second lever arm about said stationary pivot fulcrum to effect the pivotal movement of said outer end in an upward and downward direction thereabout; and wherein each of said piston rods and associated hydraulic cylinders comprises:

a hydraulic cylinder of an elongated cylindrical vertical configuration having a closed top end, a closed bottom end, and cylindrical side walls;

an elongated cylindrically spaced chamber defined interiorly of said cylinder;

a flat disc shaped piston disposed normal to the axis of the cylinder and positioned in said compartment for sliding guided movement therethrough;

an elongated rod shaped piston rod having a top end portion and a bottom end portion;

said bottom end portion being of a solid cylindrical configuration having its bottom end affixed concentrically to said piston and projecting outwardly of said cylinder top end and terminating at a juncture point with said top end portion;

said top end portion being of a flattened stock material having a flat back surface and a flat front surface diametrically opposed to said back surface;

said flat front surface provided with a continuous row of a rack of gear teeth completely therealong to the top end thereof;

a first valve disposed in said cylinder adjacent said top end thereof and in communication with said compartment;

a second valve disposed in said cylinder adjacent said bottom end thereof and in communication with said compartment;

said cylinder being of a double-acting cylinder type for pumping hydraulic fluid from said cylinder compartment on both a downstroke and upstroke of said piston;

and further characterized by a vertically disposed supporting bracket associated with each of said piston rods, each of said lever arm outer ends, and each of said drive gear trains;

a vertically aligned spaced apart series of roller guides rotatively affixed to said bracket with said rollers in guiding roller engagement with said back surface of said piston rod for guiding the vertical reciprocal movement of said piston and top end portion therealong;

a pair of tooth pinion gears rotatively affixed to said bracket in vertical alignment with each other and spaced horizontally from said roller guides, said teeth of said pinion gears engaging said rack teeth on said front surface of said top end of said piston rod to guide the same therealong and retain said piston rod captured for accurate vertical reciprocal movement between said pinion gears and said roller guides;

a first drive gear having gear teeth about its periphery in meshing engagement with said rack of teeth on said piston rod and disposed intermediate said pinion gears;

a second drive gear having gear teeth about its periphery disposed in meshing engagement with said teeth of said first drive gear;

an arcuate segment gear affixed to said outer end of said second lever arm along a diametric axis thereof and having a row of gear teeth disposed along the arcuate outermost periphery thereof, said segment gear teeth being disposed in meshing engagement with said gear teeth of said second gear;

said first and second gears being of a size relative to each other to receive a small movement of said segment gear and increase the effectiveness of said movement when driving said top end portion of said piston rod in a manner to provide said increase of the magnitude of the stroke of said piston rod relative to the fluctuation of the water level.

* * * * *